United States Patent
Schwartz et al.

(10) Patent No.: US 10,861,033 B2
(45) Date of Patent: Dec. 8, 2020

(54) CROWD SOURCING OF OBJECT OBSERVATIONS

(71) Applicant: Florida Power & Light Company, Juno Beach, FL (US)

(72) Inventors: Eric D. Schwartz, Palm Beach Gardens, FL (US); Steve D. Shnider, Wellington, FL (US); Donna M. Miceli, Jupiter, FL (US); Hari B. Dumpa, Pembroke Pines, FL (US)

(73) Assignee: Florida Power & Light Company, Juno Beach, FL (US)

( * ) Notice: Subject to any disclaimer, the term of this patent is extended or adjusted under 35 U.S.C. 154(b) by 327 days.

(21) Appl. No.: 15/882,798

(22) Filed: Jan. 29, 2018

(65) Prior Publication Data
US 2019/0236631 A1    Aug. 1, 2019

(51) Int. Cl.
| | | |
|---|---|---|
| *G06Q 30/02* | (2012.01) | |
| *H04W 4/021* | (2018.01) | |
| *H04W 4/024* | (2018.01) | |
| *G06Q 50/00* | (2012.01) | |
| *H04W 4/20* | (2018.01) | |
| *G06F 16/29* | (2019.01) | |
| *G06F 16/9537* | (2019.01) | |

(52) U.S. Cl.
CPC ......... *G06Q 30/0208* (2013.01); *G06F 16/29* (2019.01); *G06F 16/9537* (2019.01); *G06Q 50/01* (2013.01); *H04W 4/021* (2013.01); *H04W 4/024* (2018.02); *H04W 4/20* (2013.01)

(58) Field of Classification Search
CPC ................................................ G06Q 30/0208
USPC ....................................................... 705/14.19
See application file for complete search history.

(56) References Cited

U.S. PATENT DOCUMENTS

| | | |
|---|---|---|
| 7,389,181 B2 | 6/2008 | Meadow et al. |
| 8,204,684 B2 | 6/2012 | Forstall et al. |
| 8,335,526 B2 | 12/2012 | Shankaranarayanan et al. |
| 8,694,026 B2 | 4/2014 | Forstall et al. |
| 8,718,681 B2 | 5/2014 | Shuman et al. |

(Continued)

FOREIGN PATENT DOCUMENTS

WO    2013128303    9/2013

OTHER PUBLICATIONS

Alt, F., Shirazi, A.S., Schmidt, A., Kramer, U., Nawaz, Z.: Location-based crowdsourcing: Extending crowdsourcing to the real world. In: NordiCHI 2010, pp. 13-22. ACM, New York, NY (2010).

(Continued)

*Primary Examiner* — Azam A Ansari
(74) *Attorney, Agent, or Firm* — Jeffrey N. Giunta; Fleit Intellectual Property Law

(57) ABSTRACT

Systems and methods to manage a crowd sourced observation program. A plurality of participant cameras are determined where each participant camera is within a threshold distance of a geographic location for observation. An accepting participant camera is selected. Based on selecting the accepting participant camera, a cancellation of the offer is sent to each participant in the plurality of participants other than the accepting participant. Based on selecting the accepting participant camera, the accepting participant camera is instructed to go to the geographic location for image capture. The image capture is received.

19 Claims, 12 Drawing Sheets

(56) References Cited

U.S. PATENT DOCUMENTS

| | | |
|---|---|---|
| 8,923,801 B2 | 12/2014 | Fletcher et al. |
| 9,100,791 B2 | 8/2015 | Lahcanski et al. |
| 9,148,753 B2 | 9/2015 | Manber et al. |
| 9,350,909 B2 | 5/2016 | Sheaffer et al. |
| 9,509,867 B2 | 11/2016 | Camp et al. |
| 9,521,515 B2 | 12/2016 | Zimerman et al. |
| 9,654,955 B2 | 5/2017 | Fletcher et al. |
| 9,697,546 B1 | 7/2017 | Buisman et al. |
| 9,754,333 B1 | 9/2017 | Blumberg et al. |
| 2015/0154851 A1 | 6/2015 | Vincent et al. |
| 2015/0156460 A1 | 6/2015 | Szybalski |
| 2016/0057335 A1 | 2/2016 | Pisz |
| 2016/0151280 A1 | 6/2016 | Shahine |
| 2016/0196570 A1 | 7/2016 | Weingarden |
| 2017/0024397 A1 | 1/2017 | Laptev et al. |
| 2017/0086021 A1 | 3/2017 | Zimerman et al. |
| 2017/0250832 A1* | 8/2017 | Rincon ................... H04L 51/20 |
| 2018/0144356 A1* | 5/2018 | Holman ............. G06Q 30/0201 |

OTHER PUBLICATIONS

Carmody, Tim, "Crowdsourcing as a Service: Citizen Reporters, Mystery Shoppers and Intelligence Gathering", www.wired.com., published Feb. 20, 2012.
K. Benouaret, R. Valliyur-Ramalingam and F. Charoy, "Answering complex location-based queries with crowdsourcing," 9th IEEE International Conference on Collaborative Computing: Networking, Applications and Worksharing, Austin, TX, 2013, pp. 438-447.
World Needs Your Camera, www.fresconews.com, Sep. 20, 2017. 2017.

* cited by examiner

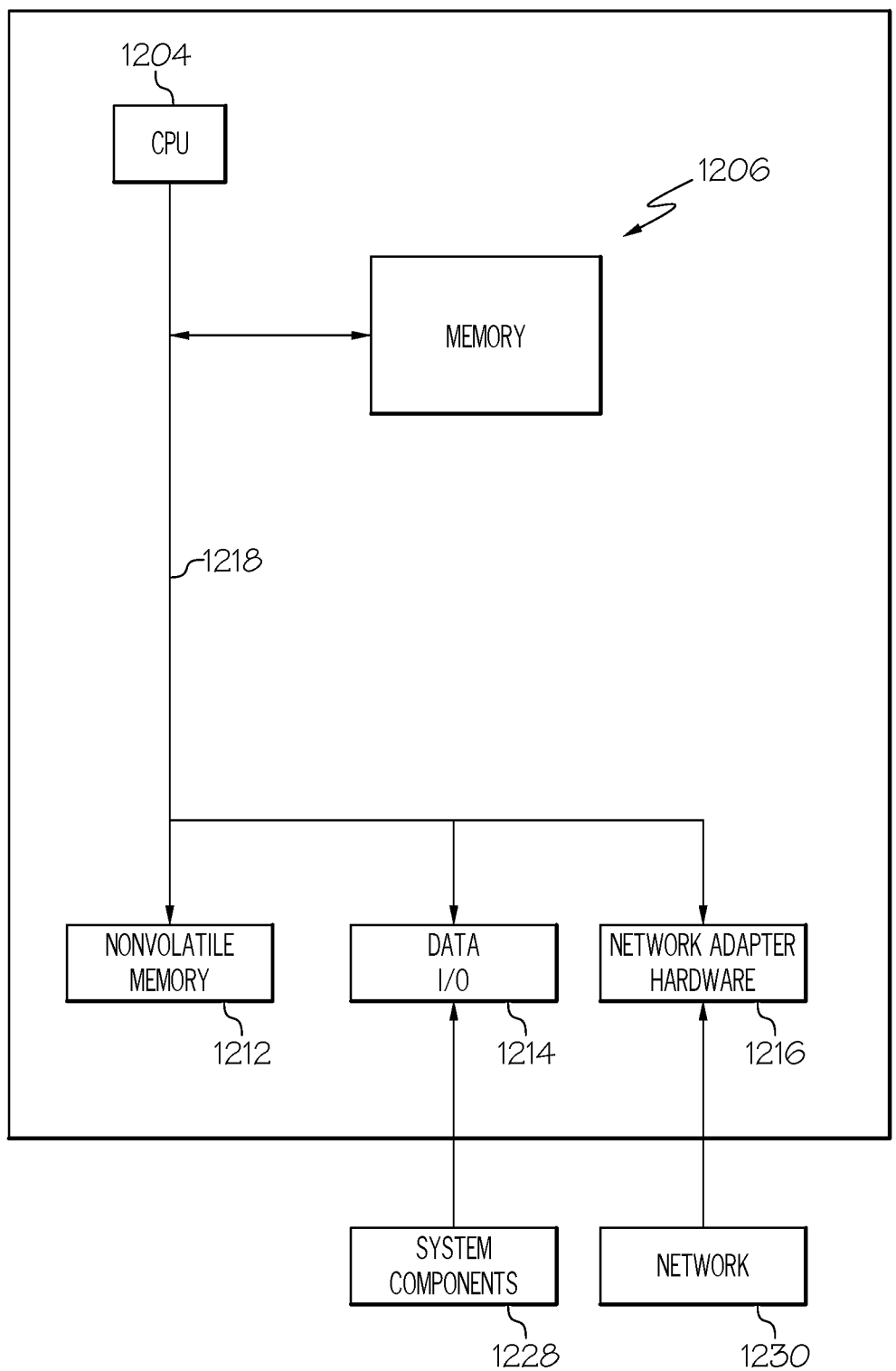
FIG. 12          1200

CROWD SOURCING OF OBJECT OBSERVATIONS

FIELD OF THE DISCLOSURE

The present disclosure generally relates to directing observations of objects located at various physical locations, and more particularly to coordinating activities to select and direct persons performing such observations.

BACKGROUND

Organizations that maintain and operate various systems, such as electrical power distribution and/or transmission systems, are generally responsible for maintaining and operating a large number of devices or objects that are distributed across a large geographic area. Issues with the devices or objects are often initially identified by customer complaints, new work requests, automated monitoring, or other methods. Addressing issues with particular devices or objects and maintaining the operations of such systems sometimes requires physical inspections or observations of particular devices or objects, such as by taking photographs, to support further analysis of the issues or to better identify problems in their operations. Such physical inspections often require a special trip by maintenance personnel to the location of the device or object.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 12 illustrates a block diagram illustrating a processor, according to an example.

DETAILED DESCRIPTION

Figure 1:
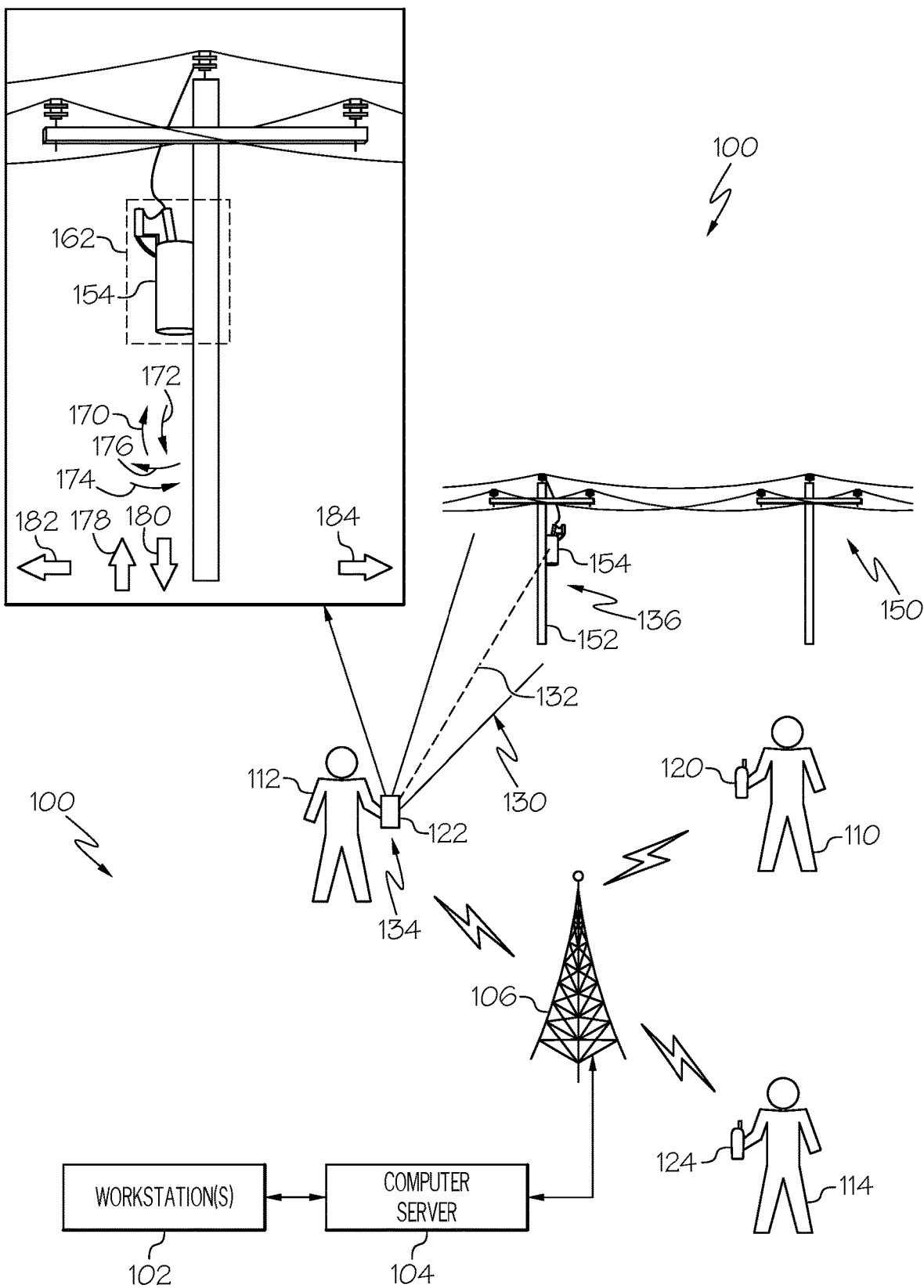
FIG. 1 illustrates a crowd sourced observation program apparatus configuration, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods provide a platform to support a crowd sourced observation program. The crowd sourced observation program includes allowing a number of people to enroll as participants who are able to be offered tasks to provide an observation of a particular object that is at a particular location within a geographic area. In an example, a list of participants is maintained by a sponsor of the crowd sourced observation program. In an example, a crowd sourced observation program is sponsored, which includes activities such as managing and operating the program, by a systems provider such as an electric power utility that operates and maintains an electrical power distribution system or electrical power transmission system. In this example, customers of the electrical power utility are able to enroll as participants. In an example, a crowd sourced observation program has participants that are able to choose to voluntarily participate in the crowd sourced observation program and are not employed by a sponsor of the crowd sourced observation program.

In an example, participants in the crowd sourced observation program have portable communications device, such as smartphones, other devices, or combinations of these. Participants in the crowd sourced observation program are able to be sent offers to take photographs or perform other observations when the maintenance department of the electric power utility determines that such observations of a particular object is desired. In an example, a participant who accepts the offer is instructed to go to the location of the particular object and make the desired observations, such as capturing image or video data of the particular object with the communications device.

Examples of objects to be observed by participants include, but are not limited to, an electrical power distribution transformer or devices in a distribution substation. In an example, participants of the crowd sourced observation program who are within a threshold distance of a particular selected object are sent the offer. In some examples, the accepting participant to accept the offer is selected to perform the observation, and the other participants are notified the offer is no longer available.

In the example of an electric power utility, an operator at a central control system for the crowd sourced observation program initiates the process of a participant performing an observation of a selected object. In an example, the operator identifies the selected object that is to be observed by a participant. Identifying the selected object in an example may include the operator using a user interface to set a graphical pin or other indicator on a map to indicate the location of the selected object. The operator is also able to provide a detailed description of the objects for which photographs, videos, or other observations are to be captured.

A notification is then sent to communications devices of all participants who are within a threshold distance of the selected object. In an example, the notification includes a message asking if the participant would go to the location of the selected object and take a few pictures or videos of the location. In general, any type of observation is able to be specified in the offer. Once the participant accepts the task, the participant's communications device in an example provides a user interface that allows capturing photographs, videos, other observation data, or combinations of these. These images (e.g., photographs), videos, other observation data, or combinations of these, are then sent to the central control system for use by various personnel, such as trained maintenance personnel.

In one example, the participant has a portable communications device that he or she takes to the location of the selected object to be observed. The portable communications device in some examples is able to be a smartphone or other portable device that supports data communications. In some examples, each participant uses an application program, such as an "app," that operates on his or her portable communications device that implements the user interfaces used by the participant to interact with, and participate in, the crowd sourced observation program. In the example of an electric power utility, the participant's interaction with and participation in the crowd sourced observation program is facilitated by an app on the participant smartphone or other device that also provides other facilities for other interactions with the electric power utility. For example, the app may provide access to the participant's customer account with the electric power utility, provide information about the operational status of various functions of the electric power utility, provide other information or interactions with the electric power utility, or combinations of these.

In some examples, the participant is able to perform the observation task without real time interaction with an operator at the central control center. In such examples, the participant receives detailed information specifying the location to be visited and the object or objects to photograph, take videos of, otherwise observe, or combinations of these. In one example, the app supporting the participant's participation in the crowd sourced observation program provides a user interface that allows the participant to capture a particular number of photographs that are then uploaded to the central control center. The number of captured photographs may be a fixed number defined by the app, may be a number specified by the operator at the central control center initiating the observation task, may be a number defined by any other manner, or combinations of these. In some examples, the number of photographs captured by the participant is not fixed. Once the participant in these examples captures the photographs or other observations and sends them to the central control center, maintenance personnel are notified that the photographs or other observations are available, such as by an e-mail to the operator who initiated the observation task. In an example, the operator is then able to see the captured photos or other observations.

In another example, the app allows the participant to have real time interaction with the central control center while performing the observation tasks. Such interaction is able to include, for example, directions for traveling to the location of the selected object, instructions for capturing photographs of the selected object, instructions such as camera angles or positions for capturing photographs of the object, instructions to capture videos, other instructions, or combinations of these. Interactions with the central control center is able to include interactions with live operators, interactions with automated resources providing voice recognition and spoken instructions, interactions with automated resources providing text interaction with the participant, interaction with any suitable resource, or combinations of these.

In some examples, participants are able to be compensated for performing the task. In some examples, participants are able to be paid a fixed amount, an amount dependent upon the nature of the selected object to be observed, an amount dependent upon the distance the participant has to travel to the selected object from the time he or she receives the offer, an amount dependent upon any one or more other factors, or combinations of these. In some examples, a game type rewards system may be implemented to provide a variable amount of compensation that may be based on chance.

The below described systems and methods allows sponsors of systems with objects distributed over a geographic area to efficiently employ a large number of people to perform observations of those objects when such observations are required. In some examples, many labor hours of wasted driving time by employed maintenance personnel can be saved. Implementation of a crowd sourced observation system is also able to increase productivity within the operations of entities managing such systems.

FIG. 1 illustrates a crowd sourced observation program apparatus configuration 100, according to an example. The crowd sourced observation program apparatus configuration 100 includes components to implement the crowd sourced observation program. In order to more clearly and simply describe the relevant aspects of the components used to implement the crowd sourced observation program, the illustrated crowd sourced observation program apparatus configuration 100 presents a simplified illustration of relevant components. It is to be understood that various implementations are able to include multiples of the illustrated components as well as other components or fewer components than are illustrated in this example.

The crowd sourced observation program apparatus configuration 100 includes a computer server 104 that controls, coordinates, otherwise facilitates, or combinations of these, the operation of a crowd sourced observation program. The computer server 104 in an example, maintains databases, which is an example of a list, of the participants of the crowd sourced observation program, manages presenting information to operators, creating and sending offers to observe selected objects to the participants of the crowd sourced observation program, manage communications between an operator and a participant of the crowd sourced observation program, receive and store images, other data, or combinations of these, that are received from participants observing selected objects, performs other functions associated with the crowd sourced observation program, or any combination of these. In some examples, parts or all of several of the methods described below are performed by the computer server 104 or a similar computing apparatus.

One or more workstation(s) 102 provide a user interface for operators to interact with the computer server and communicate with participants in the crowd sourced observation program. In some examples, the workstation(s) 102 include graphical displays that are able to present images, videos, alphanumeric information, other information, or combinations of these. Further, the workstation(s) 102 in some examples include facilities to implement audio communications with participants of the crowd sourced observation program who are observing objects as part of that program. In various examples, an operator at workstation(s) 102 is able to provide indications of the geographic location for observation of selected object, provide ratings for observation data received from participants, The computer server 104 in an example is connected to a wide area wireless communications system 106. The wide area wireless communications system depicted in this example is able to include various components, such as publicly available cellular data communications, other wireless communications, or combinations of these. The wide area wireless communications system 106 in some examples includes a number of radio transmission towers and transceivers to allow wireless communications over a wide area.

The crowd sourced observation program apparatus configuration 100 depicts an example number of participants in the crowd sourced observation program who each have a portable communications device. In an example, each portable communications device has a camera along with other components to support the operation of the below described systems and methods. The crowd sourced observation program apparatus configuration 100 depicts a first participant 110 with a first communications device 120, a second participant 112 with a second communications device that has an accepting participant camera 122, and a third participant 114 with a third communications device 124. In operation, the crowd sourced observation program apparatus configuration 100 is able to have any number of participants with communications devices. In an example, the wide area wireless communications system 106 supports communications between the computer server 104 and the communications devices held by the various participants. In general, the participants are able to have similar or different communications devices that each has a camera.

The communications devices for each participant in an example is able to receive information from the computer server 104, capture observation data such as images, videos, other observation data, or combinations of these, communicate the observation data back to the computer server 104, and support interactions between the participant and an operator at a workstation(s) 102 working via the computer server 104. In some examples, the communications devices, such as the first communications device 120, the second communications device that has an accepting participant camera 122, and the third communications device 124, each have location equipment to determine and report the present geographic location of that device, and thus the present geographic location of the participant associated with that device. In some examples, the location equipment sends reports of the present geographic location that is determined location of its communications device to the computer server 104 for use in determining which participants are near a geographic location for observation.

In the following discussion, interactions between the computer server 104 and the participants of the crowd sourced observation program are conducted through a respective communications device that is associated with each participant. In an example, each communications device has a camera that is able to capture images, such as images of an object to be observed. In general, a description of sending any information, instructions, offers, other data, or combinations of these to a participant is referred to as sending such information, instructions, offers, other data, or combinations of these to a participant camera that is associated with that participant.

The crowd sourced observation program apparatus configuration 100 depicts a portion of an electrical distribution system 150. The depicted portion of the electrical distribution system includes a pole 152 that has a pole mounted transformer 154. In an example, the three (3) participants depicted in the crowd sourced observation program apparatus configuration 100 are in the vicinity of the pole 152. In an example the vicinity of the pole is defined as being a threshold distance from the pole 152.

In an example, an operator at a workstation 102 is able to initiate an observation of the pole mounted transformer 154 by a participant in the crowd sourced observation program. In such an example, an offer to perform the observation is sent to the communications devices of participants who are within a threshold distance of the pole 152, and thus the pole mounted transformer 154. As described herein, one of the participants is able to accept the offer and perform the observation. Such a participant is referred to herein as an accepting participant. In an example, interactions between the computer server 104 and the accepting participant are referred to as interactions with the accepting participant camera.

In the example depicted in the crowd sourced observation program apparatus configuration 100, the third participant 112 is the accepting participant, and thus has, and is therefore associated with, the accepting participant camera 122. As shown in the crowd sourced observation program apparatus configuration 100, the accepting participant 112, and the accepting participant camera 122, are located near the pole 152 and the pole mounted transformer 154. This example may reflect the position of the accepting participant 112, and the accepting participant camera 122, after the accepting participant camera 122 has been instructed to go to the geographic location for image capture. In this illustration, the accepting participant camera 122 has a present camera location 134 and the pole mounted transformer has an object location 136. In general, the present camera location 134 and the object location 136 are three-dimensional location values that are precisely determined, such as by GPS receivers.

In the illustrated example, the accepting participant 112 has pointed the accepting participant camera 122 towards the pole mounted transformer 154 and has begun to capture images of the pole mounted transformer 154. The accepting participant camera 122 is shown to have a field of view 130 that includes the pole mounted transformer 154 and surrounding objects. The accepting participant camera 122 has a pose angle 132 that corresponds to an axis along which the accepting participant camera 122 captures images. In an example, the accepting participant camera 122 includes geographic location determination equipment, such as a GPS receiver (not shown), and camera pose angle determination equipment, such as a compass (not shown) to determine an azimuth direction of the pose angle 132 and an accelerometer (not shown) to determine elevation angles of the pose angle 132.

The crowd sourced observation program apparatus configuration 100 depicts an image capture display 160 that is presented in this example on a display of the accepting participant camera 122. The image capture display 160 includes the captured image of the pole 152 and the pole mounted transformer 154. In the illustrated example, the image capture display 160 further includes various augmented reality image elements that are superimposed on the captured image. In some examples, the augmented reality image elements are provided to give the accepting participant 112 instructions for locating or angling the accepting participant camera 122 to capture additional images of the object of interest.

In some examples, the augmented reality image elements are provided on the image capture display 160 to reflect and indicate instructions that are generated by an operator at workstation 102 based on receiving images from the accepting participant camera 122. In some examples, such instructions direct the accepting participant 112, who is operating the accepting participant camera 122, to move the location of the accepting participant camera 122, change the pose angle of the accepting participant camera 122, take other actions, or combinations of these.

The image capture display 160 illustrated in this example presents augmented reality image elements that are direction arrows to direct the accepting participant 112, who is operating the accepting participant camera 122, to move or re-orient the accepting participant camera 122. The illustrated image capture display 160 in this example presents all of the direction arrows that are able to be presented in order to concisely and clearly depict these elements. In general, only one or a few of the possible direction arrows are presented at one time.

The image capture display 160 presents a number of camera pose angle adjustment directions arrows to direct the accepting participant 112 to change the camera pose angle in a desired direction. The image capture display 160 includes camera pose angle adjustment direction arrows that include: an up tilt arrow 170; a down tilt arrow 172; a left tilt arrow 174 and a right tilt arrow 176.

The image capture display 160 also presents a number of ground position movement directions arrows to direct the accepting participant 112 to move to a different location on the ground. The image capture display 160 includes ground position movement direction arrows that include: a forward movement arrow 178; a backward movement arrow 180; a left movement arrow 182; and a right movement arrow 184.

In an example, which direction arrows that are presented on the image capture display 160 at a particular time reflect differences between the present camera pose angle 132 reported by the accepting participant camera 122, the present location of the accepting participant camera 122, and a particular pose angle and present location for the accepting participant camera 122 that is chosen to capture images of the object to be observed. In an example, some objects may have preferred pose angles for capturing images of, for example, a particular portion of the object. In such an example, which ground position movement direction arrows to be presented on the image capture display 160 are able to be determined based on differences between the present location of the accepting participant camera 122, such as are reported by a GPS receiver that is a part of the accepting participant camera 122, and a desired location for the accepting participant camera 122 that allows capturing images of the object at the preferred pose angle. Pose angle adjustment direction arrows are also able to be determined based upon differences between present pose angle of the accepting participant camera 122, such as is reported by a compass and accelerometer in the accepting participant camera 122, and the desired pose angle. Further, direction arrows are able to be provided as visual direction feedback on the image capture display to adjust the content of captured images based upon judgment of an operator receiving such images. In some examples, direction arrows are augmented reality instructions that are provided as additional instructions to the accepting participant camera where those additional instructions are provided based on receiving an image capture of the object and are instructions for capturing additional images of the object.

In some examples, augmented reality image elements are used to indicate the object of interest of which images are to be captured. In the illustrated example, an object box 162 is superimposed on the captured image to identify the object of interest that is to be observed, i.e., the pole mounted transformer 154 in this example. Object image box 162 may be generated by an image recognition process comparing an image of a known object, i.e. power mounted transformer, with the image from the accepting participant camera 122. The image recognition process may be facilitated by analyzing the known location and orientation of accepting participant camera 122 and the known location of transformer 154. Such an indication 162 assists the accepting participant in locating and/or centering the object of interest in captured images, assists in providing proper focusing of the accepting participant camera 122, provides other assistance, or combinations of these.

Figure 2:
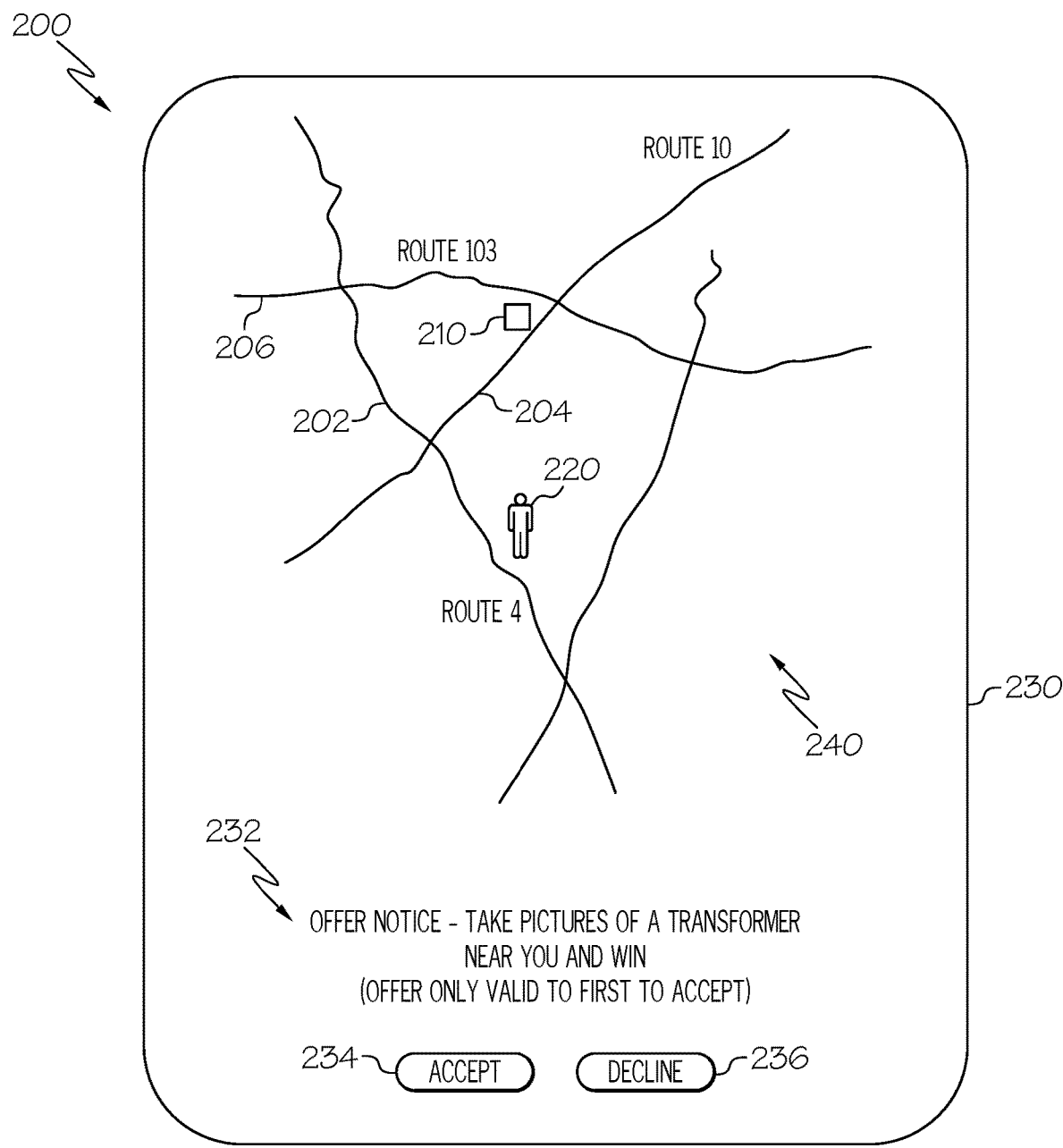
FIG. 2 illustrates a first participant's offer notification display, according to an example.

FIG. 2 illustrates a first participant's offer notification display 200, according to an example. The first participant's offer notification display 200 is an example of a display presented to a participant in a crowd sourced facility inspection program. In an example, persons who are registered in the crowd sourced facility observation program receive notifications of offers to physically inspect, photograph, or otherwise provide observations of selected objects at locations that have been identified by a central operator.

The first participant's offer notification display 200 in this example is presented to a particular participant, referred to herein as a first participant. The first participant's offer notification display 200 reflects the physical location of the first participant on a displayed geographic map. The physical location of the first participant is able to be determined by any suitable technique, such as by querying location information determined by the device presenting the first participant's offer notification display 200.

In an example, data is sent to a communications device, such as a smart phone or other device, that describes an offer to physically inspect and photograph selected locations. The participant's offer notification display 200 depicts a display 230 that presents information related to the offer to physically inspect and photograph selected objects at a particular location. The display 230 in an example is a display on a smartphone or other device that a user has available to receive and view such offers. In general, the participant's offer notification display 200 is able to be presented on any type of device.

In an example, the first participant's offer notification display 200 is part of a crowd sourced facility observation program that is sponsored by an entity associated with the facility to be inspected. In some examples, the participant's offer notification display 200 is presented as part of an application, such as an "app," that executes on a user's smartphone or other communications device. This application in some examples is associated with the entity that is associated with the facility to be inspected. In some examples, the participant's offer notification display 200 is part of an application that allows the user to interact with the entity. In an example, the application is sponsored by a utility and the application that presents the participant's offer notification display 200 also allows the user to, for example, obtain information about his or hers account with the utility, obtain other information, or combinations of these.

The first participant's offer notification display 200 includes an offer portion 232. The illustrated offer portion 232 in this example includes the text "OFFER NOTICE—TAKE PICTURES OF A TRANSFORMER NEAR YOU AND WIN." The offer portion 232 further notes "OFFER ONLY VALID TO FIRST TO ACCEPT." In this example, only one acceptance of the offer that is made to the participants will be accepted, and when the first participant accepts the offer, the offer is cancelled for the other participants as is described below. Such offers are able to provide compensation to the person who accepts and performs the observation specified in the offer. In the illustrated example, the compensation is a chance to win a prize.

The first participant's offer notification display 200 depicts a geographic map 240 that shows the location of a selected object 210. The selected object 210 is the object that the person is being asked go to and photograph. The geographic map 240 also shows a number of roads to give geographic context of the location of the selected object 210. The participant's offer notification display 200 also depicts a first user's location 220 on the geographic map 240 in order to aid the first user in determining how far he or she is from the selected object 210 and which route would be the best to take to get there.

The geographic map 240 includes route 4 202, route 10 204, and route 103 206. The selected object 210 is shown near the intersection of route 10 204 and route 103 206. As depicted the first user's location 220 is on route 4 a short distance from route 10 204. The information depicted by the geographic map 240 assists a user in determining if he or she is interested in traveling to the location of the selected object 210 to take photographs or make other observations.

The first participant's offer notification display 200 further includes an accept button 234 and a decline button 236. In the illustrated example, the accept button 234 and the decline button 236 are included on the touch screen display 230 and a user is able to select one of these buttons by touching its presentation. In further examples, a participant is able to accept the presented offer by any suitable technique, such as by pressing indicated keys, providing any response such as a gesture, voice response, any other response, or combinations of these. If a participant viewing the first participant's offer notification display 200 wishes to accept the offer, he or she selects the accept button 234. If the participant wishes to decline the offer, the decline button 236 is able to be selected. In an example, once any other participant accepts the offer, the offer terminates and the participant is notified with a subsequent display as is described in further detail below.

Figure 3:
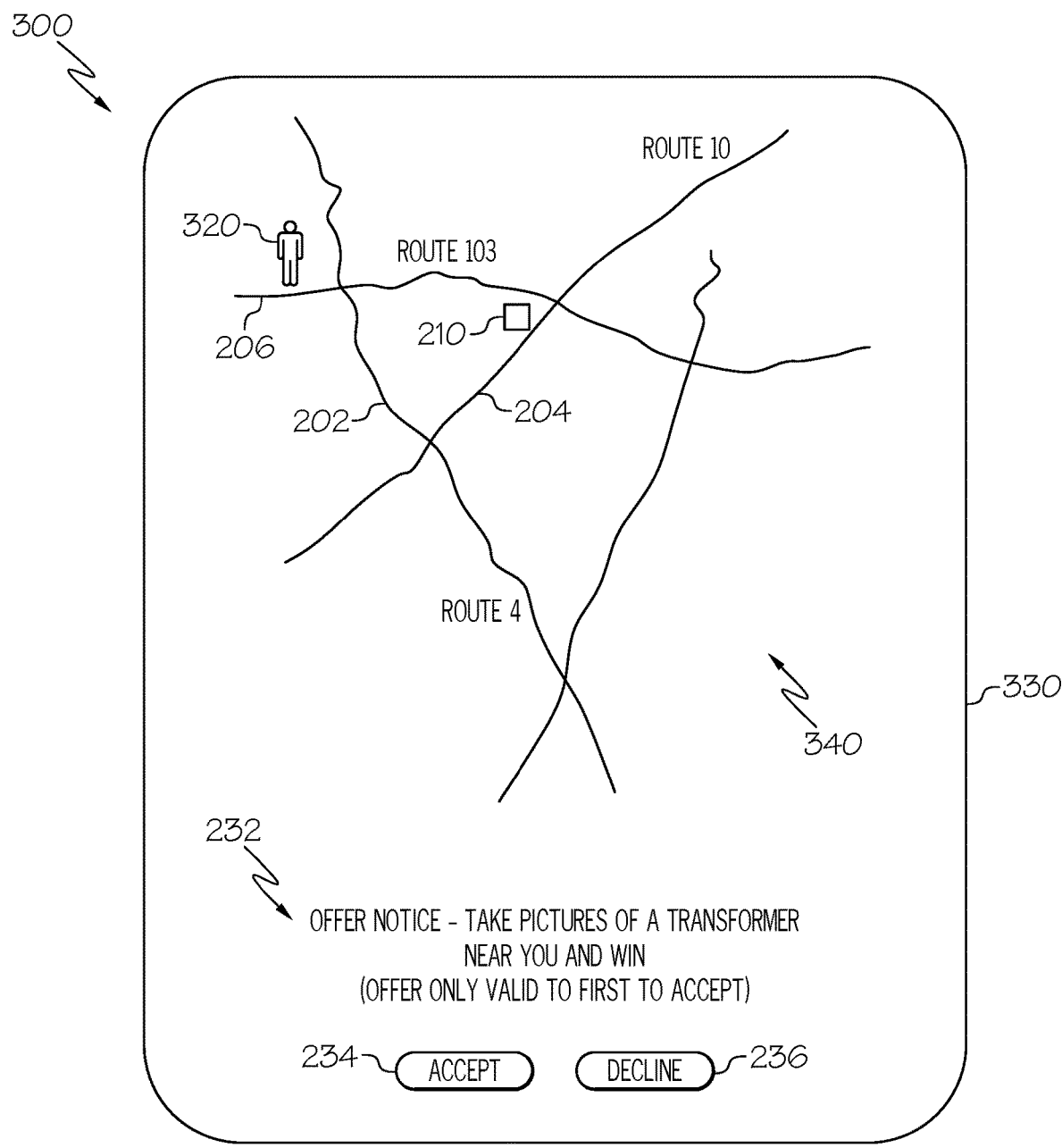
FIG. 3 illustrates a second participant's offer notification display, according to an example.

FIG. 3 illustrates a second participant's offer notification display 300, according to an example. The second participant's offer notification display 300 is an example of a display presented to a second participant in the crowd sourced facility observation program. The second participant's offer notification display 300 is similar to the above described first participant's offer notification display 200 except that the physical location of the second participant is presented on a displayed geographic map. As described above, the physical location of the second participant is able to be determined by any suitable technique, such as by querying location information determined by the device presenting the second participant's offer notification display 300.

The second participant's offer notification display 300 includes a second display 330 that is part of a device available to the second participant. In an example, the second display 330 is a display of a smartphone or other portable communications device carried by the second participant. The second participant's offer notification display 300 also includes a copy of the above described offer portion 232, a respective accept button 234 and respective decline button 236.

The second participant's offer notification display 300 includes a second geographic map 340. The second geographic map 340 includes depictions of the same roads as are described above with respect to the first geographic map 240. The selected object 210 is also presented on the second geographic map 340. The physical location 320 of the second participant is also shown on the second geographic map. In this example, the second participant is located on route 103 206 a bit west of route 4 320.

In an example, a computer server at a central operations center is sends offers, such as are depicted above, to devices of participants of a crowd sourced facility observation program who are within a defined geographic distance of the selected object 210. Any of these participants are able to accept the offer, such as by selecting the accept button 234 as is described above. In an example, the device presenting the offer sends a message to the computer server at the central operations center indicating that the participant has accepted the offer. The participant who first accepted the offer and whose response was first received by the computer server in an example is sent a message confirming that the acceptance was successfully received first and that the participant should proceed to perform the requested observation. In an example, the computer server responds to the first received acceptance by terminating the offer and sending a message that cancels the offer to the other participants to whom the offer was sent.

Figure 4:
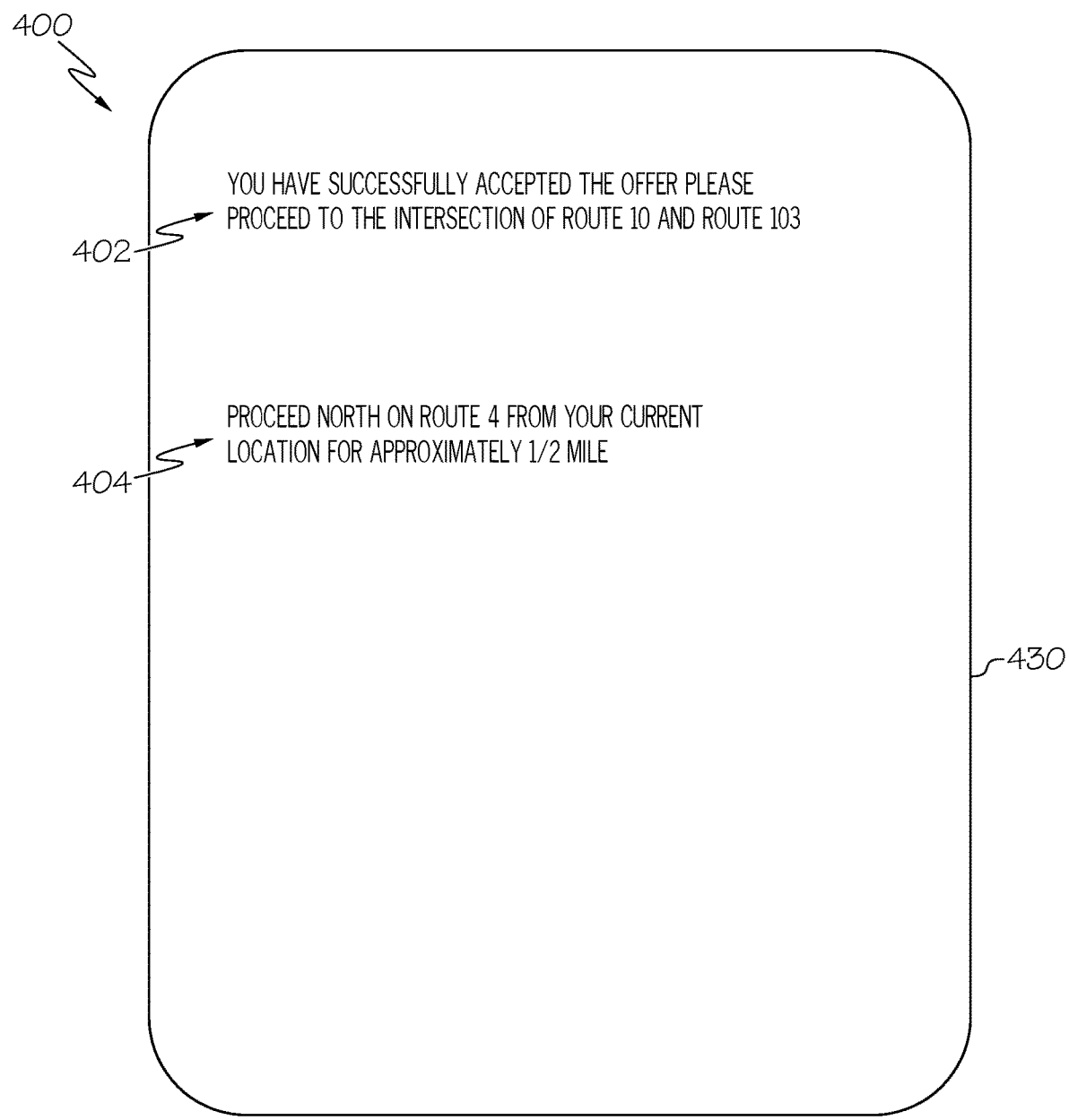
FIG. 4 illustrates an offer accepted display, according to an example.

FIG. 4 illustrates an offer accepted display 400, according to an example. The offer accepted display 400 is presented to the participant who is the first to submit an acceptance of an offer made to participants of the crowd sourced facility observation program. In an example, the offer accepted display 400 is presented to the first participant that accepted the offer.

The offer accepted display 400 in the illustrated example is presented on a display 430 of the device of the accepting participant. The offer accepted display 400 includes an acceptance confirmation portion 402 that states "YOU HAVE SUCCESSFULLY ACCEPTED THE OFFER. PLEASE PROCEED TO THE INTERSECTION OF ROUTE 10 AND ROUTE 103." The offer accepted display 400 in an example further includes an initial driving instruction 404 that aids the participant in traveling to the location of the selected object 210. In the illustrated example, the offer was successfully accepted by the first participant, whose location 220 is depicted on the first geographic map 240. As is shown on that map, the first participant is able to reach the location of the selected object by traveling north on route 4 202. Such instruction is provided in the initial driving instruction 404, which states "PROCEED NORTH ON ROUTE 4 FROM YOUR CURRENT LOCATION FOR APPROXIMATELY ½ MILES." In further examples, driving or any traveling directions are able to be provided by any suitable technique, such as by voice instructions, other alpha-numeric displays, graphical displays, any other indications, or by combinations of these.

Figure 5:
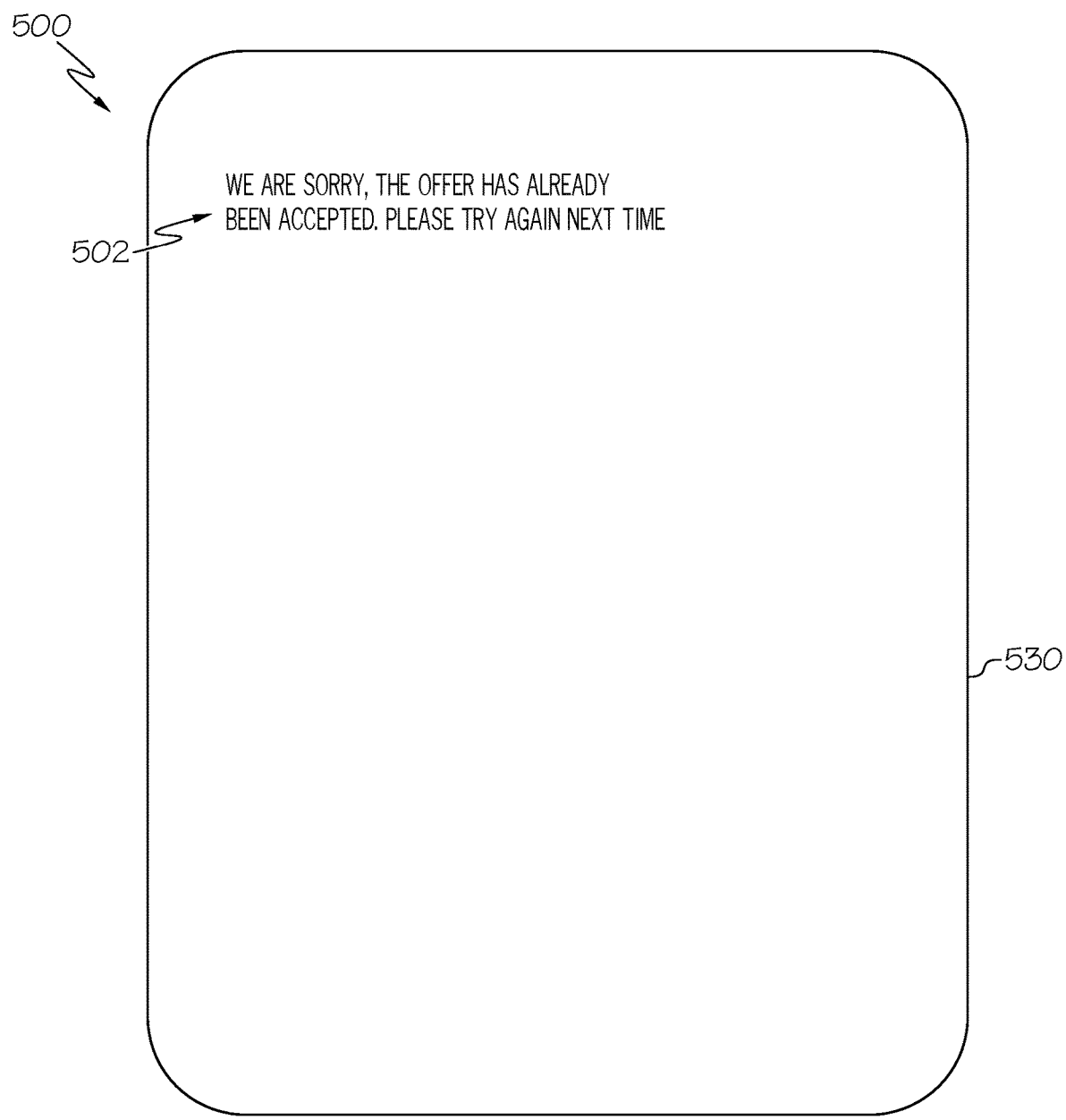
FIG. 5 illustrates an offer cancellation display, according to an example.

FIG. 5 illustrates an offer cancellation display 500, according to an example. The offer cancellation display 500 in an example is sent to all participants that received the offer described above except for the first person to successfully accept the offer. The offer cancellation display 500 includes a cancellation portion 502 to notify the participant that the offer has been cancelled. The cancellation portion 502 in this example states "WE ARE SORRY, THE OFFER HAS ALREADY BEEN ACCEPTED. PLEASE TRY AGAIN NEXT TIME." In an example, the offer cancellation display 500 is presented based upon offer cancellation information sent by the computer server to the devices of the intended recipients.

Figure 6:
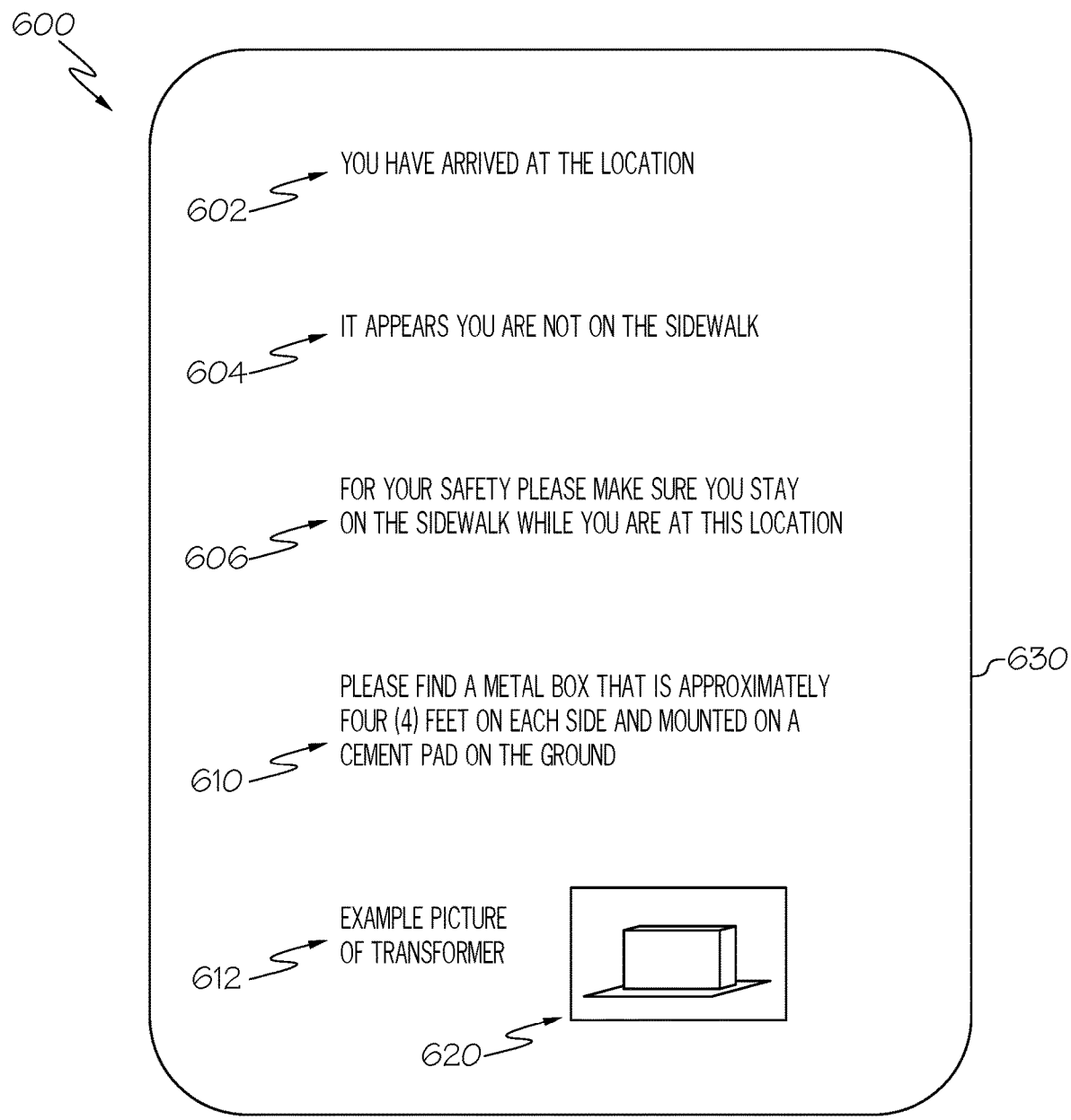
FIG. 6 illustrates an observation instruction display, according to an example.

FIG. 6 illustrates an observation instruction display 600, according to an example. The observation instruction display 600 is an example of a display that provides instructions to a participant of the crowd sourced facility observation program when that participant is in the vicinity of the selected object to be observed. In general, the observation instruction display 600 is presented on a display 630 after the participant who accepted an offer to observe a selected object 210 has moved from his or her initial location to the area of the selected object 210. In some examples, the participant is given more detailed driving directions in order to facilitate movement from the participants initial location to the location of the selected object 210.

The observation instruction display 600 is presented on a display 630 of the participant's device. In an example, this display 630 is the same display that presented the original offer and the offer accepted display 400. In an example, the display 630 is on a device that is able to accompany the participant as he or she moves to the area of the selected object 210.

The observation instruction display 600 includes an arrival notification 602. The arrival notification 602 alerts the participant that he or she is near the selected object 210 and he or she should look for the object and begin to capture observations, such as images, videos, other observations, or any combination of these.

The observation instruction display 600 includes a safety warning 604. In an example, the participant's location is determined with a degree of accuracy that allows determining whether the participant is in an unsafe area such as on an active street or other unsafe area. In an example, the participant's location is compared to information is compared to information defining the locations of streets, sidewalks, unsafe areas such as steep embankments or unstable soil, or any combination of these, to ensure the participant is in a safe area. When it is determined that the participant is in an unsafe area, the safety warning 604 is provided to alert the participant of that situation.

The observation instruction display 600 includes a safety direction 606 that informs the participant to stay on a sidewalk in this example. In further examples, specific instructions are able to be provided such as instructions to move in a particular direction to move onto a sidewalk or away from unstable soil.

The observation instruction display 600 includes an observation instruction 610 that instructs the participant to find the selected object. In general, an observation instruction 610 describes the selected object with sufficient clarity and detail so as to allow an untrained person to recognize the selected object. In this example, the observation instruction 610 describes a pad mount power transformer and states "PLEASE FIND A METAL BOX THAT IS APPROXIMATELY FOUR (4) FEET ON EACH SIDE AND MOUNTED ON A CEMENT PAD ON THE GROUND."

In some examples, the observation instructions may include descriptions of somewhat similar objects that might be in the area but are not the selected objects. In an example of directing the participant to observe a pad mount power transformer, an instruction may include a description of an underground telephone cable interconnection box that is known to be nearby and a notion that such an object is not the selected object to be observed.

The observation instruction display 600 includes an example picture 620 that in an example is a stock photo of an object similar to the selected object 210 that is to be observed. The example picture is provided to help the participant accurately and easily identify the selected object 210 and not mistake a similar object as the object of interest that is to be observed. The example picture 620 has a label 612 identifying the selected object and indicting that this is an example picture of same.

Figure 7:
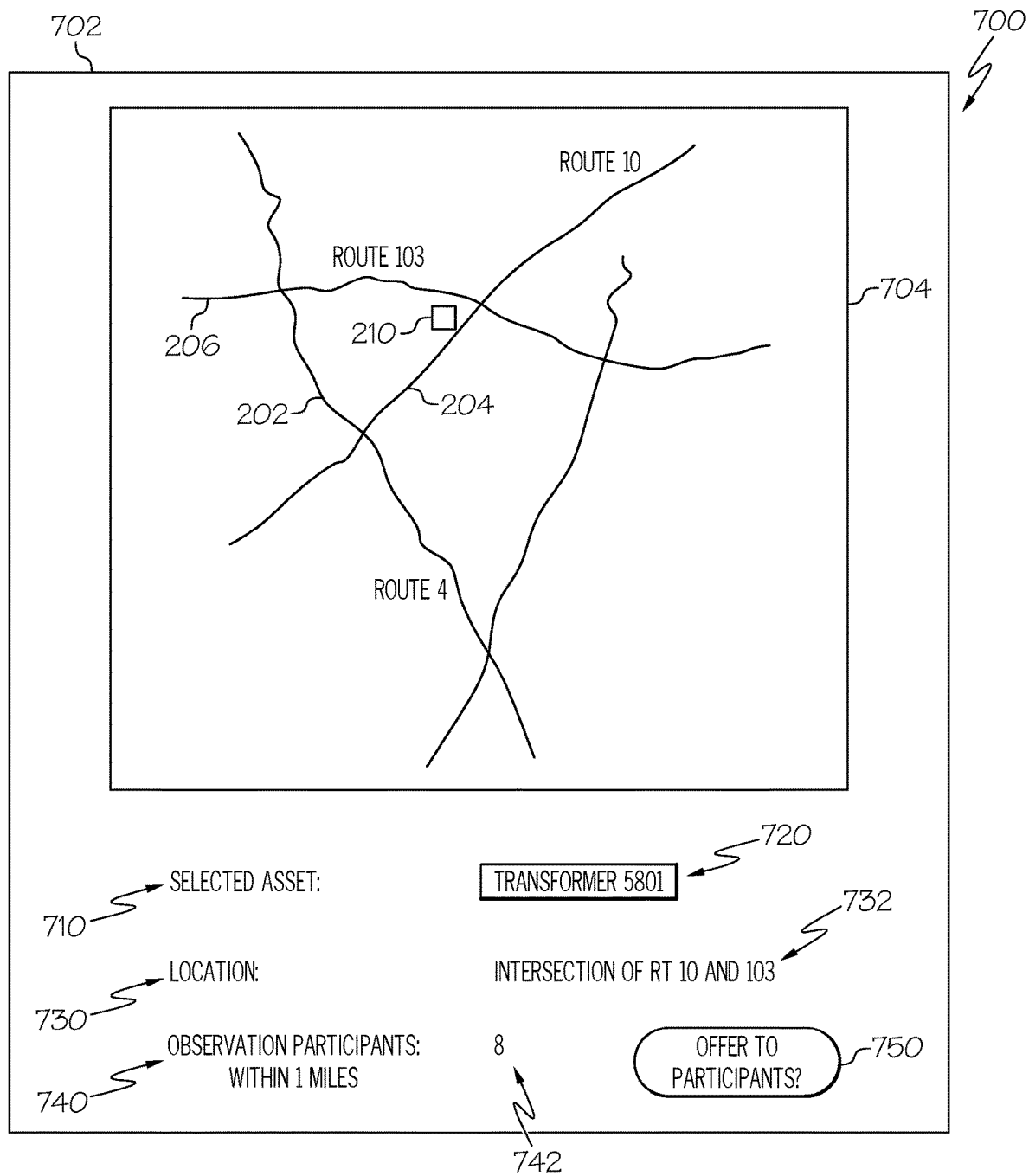
FIG. 7 illustrates a central operator's user interface, according to an example.

FIG. 7 illustrates a central operator's user interface 700, according to an example. The central operator's user interface 700 in an example is a user interface presented to an operator at the entity that is associated with the crowd sourced observation program. In an example, the central operator's user interface 700 is presented on a user's workstation connected to a computing server that is controlling the crowd sourced observation program. The central operator's user interface 700 allows an operator to specify an asset, such as a physical facility, installed equipment, any object, or combinations of these, that is being considered as a selected object 210 for observation by a participant of the crowd sourced observation program.

The central operator's user interface 700 includes a "selected asset" line 710 that has an asset input box 720. The selected asset line 710 allows an operator to specify an object that might be observed by a participant of the crowd sourced observation program. The asset input box 720 allows the specification of a particular object that is desired to be observed. In the illustrated example, "TRANSFORMER 6801" is specified as the object to be observed. In this example, "5801" is an identification number for the particular transformer of interest. The selected asset specified in the asset input box 720 is the selected object that would be the subject of an offer sent to participants of the crowd sourced observation program that are near that object.

In various examples, identification of the object specified in the asset input box 720 is able to be obtained according to any suitable technique. In some examples, an identifier of the specified object in the asset input box 720 is provided by an automated means that is linked to other service components. For example, a system monitoring system, such as a Supervisor Control And Data Acquisition (SCADA) system may provide indications of abnormalities that suggest a particular asset may be degraded or malfunctioning. In such an example, the system monitoring system provides an identification of that particular asset and that identification is automatically provided to the central operator's user interface 700 and inserted into the asset input box 720.

The central operator's user interface 700 includes a location line 730 that has an asset location specification 732. The asset location specification 732 in this example indicates "INTERSECTION OF RT 10 and 103." This is the geographical location of the selected object 210 that is discussed above. In some examples, the asset location specification 732 specifies locations that are obtained from an asset location database for the asset specified in the asset input box 720.

The central operator's user interface 700 includes a nearby participant indication line 740. The nearby participant indication line 740 includes a participant count indicator 742 that indicates the number of available participants in the crowd sourced observation program that are within a determined threshold distance of the location of the asset specified in the asset input box. The illustrated example indicates that eight (8) available participants are within that threshold distance of that location. In an example, the participant count indicator 742 indicates the number of available participants as can be determined by any suitable technique. In an example, a participant is determined to be available if he or she is determined to have a communications device, such as a smart phone, that is on and able to receive an offer to observe a selected object. In further examples, available participants are able to be identified based on different criteria, such as selecting an indicator on their communications device that they are available (or conversely unavailable), based on other criteria, or based on combinations of these.

The central operator's user interface 700 includes a display 702 that presents an operator's view geographic map 704. The operator's view geographic map 704 in an example depicts roads, other geographic features such as hills, bodies of water, other features, or combinations of these, to assist the operator in evaluating the suitability of sending a participant of the crowd sourced observation program to observe a particular object of interest. In an example, an operator may determine that a particular selected asset is not suitable for observation by a participant of the crowd sourced observation program. For example, the selected asset may be too remote for a participant to visit, weather conditions such as snow melting or high water may make the selected asset difficult to visit, there may be other considerations based on the location of the selected asset that do not make the asset suitable for observation by a participant of the crowd sourced observation program, or any combinations of these may be considerations for not offering this selected asset for observation. Further, the number of available participants indicted in the participant count indicator 742 may be too low for an effective offer.

The central operator's user interface 700 includes an offer to participants button 750. In an example, when the operator decides that the selected asset is suitable for observation by a participant of the crowd sourced observation program, the operator is able to select the offer to participants button 750 to cause an offer to send to available participants within a threshold distance of the selected asset.

Figure 8:
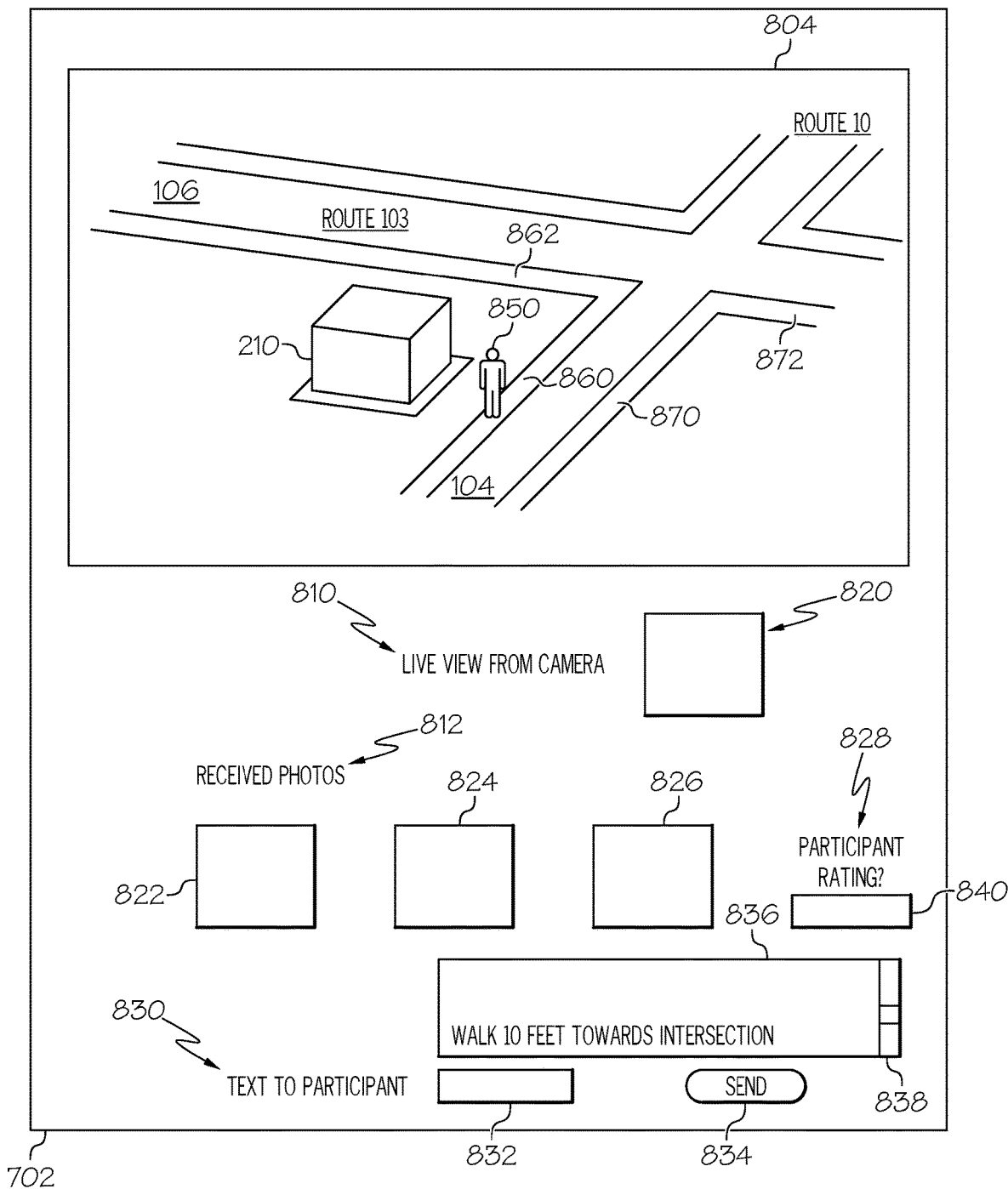
FIG. 8 illustrates an operator's observation view, according to an example.

FIG. 8 illustrates an operator's observation view 800, according to an example. The operator's observation view 800 is an example of a view presented to an operator at an operator's workstation once a participant of the crowd sourced observation program has arrived at the location of a selected object 210. Once the participant has arrived at the location of the selected object 210, the participant is able to capture photographs, videos, other observations, or combinations of these that are sent back to the computer server.

The operator's observation view 800 in an example allows the operator to interact with the participant, receive photographs and send photographs or other information back to the computer server controlling the crowd sourced observation program. The operator's observation view 800 includes a local map 804 of the area around the selected object 210. The participant's location 850 is shown on the local map 804. The participant's location 850 is determined in an example by high resolution location equipment, such as a GPS receiver, that is part of a communications device operated by the participant. The computer server in an example superimposes an icon, image, other aid, or combinations of these, at the location on the local map 804 that corresponds to the participant's location 850 that is reported by the participant's device.

The local map 804 in this example is a rendering of map data stored on a server with various images superimposed on the map image. The local map 804 in this example is not a live video of the depicted intersection. The depicted local map 804 includes depictions of relevant items that are in close proximity to the selected object 210. For example, the two intersecting roadways, Route 10 204 and Route 103 206 are depicted. Further depicted are sidewalks that are along those roadways. A first route 10 sidewalk 860 is shown on one side of route 10 204, and a second route 10 sidewalk 870 is shown on the opposite side of route 10 204. The participant's location 850 is shown as being on the first route 10 sidewalk 860. Further shown are sidewalks along one side of route 103, i.e., a first route 103 sidewalk 862 and a second route 103 sidewalk 872.

In an example, the operator's observation view 800 provides updates of the participant's location 850 as the participant moves around the selected object. The operator viewing the operator's observation view 800 in an example is thus able to monitor the participant's location 850 as the participant moves around the selected object 210. For example, the operator is able to see if the participant begins to move too close to the edge of the first route 10 sidewalk 860 and might walk onto the roadway of route 10 204. The operator in that example is able to warn the participant of this potentially unsafe condition and instruct the participant to, for example, move closer to the object of interest and thus away from the road.

The illustrated operator's observation view 800 includes a live view from camera label along with a participant's camera view 820. In an example, the communications device used by the participant is able to capture and stream live video as the participant moves around the selected object 210. This live video stream in an example allows the operator to provide real time feedback to the participant regarding, for example, locations and poises for capturing images of the selected object, provide other instructions, or combinations of these.

The operator's observation view 800 includes a received photos section 812. The received photos section 812 includes a display of photographs that the participant captured of the selected object and sent back to the server computer. The illustrated example depicts three photographs, a first photograph 822, a second photograph 824, and a third photograph 826. In various examples, a participant is able to capture any number of photographs that are sent back to the computer server and displayed to the operator. In various examples, any suitable technique is able to be used to allow the operator to view the multiple photographs, such as by scroll bars, scrolling arrows, other facilities, or combinations of theses. In some examples, the participant does not send a live video feed and the only images available for review by the operator are the images displayed in the received photos section 812.

The operator's observation view 800 includes a participant's rating 828 portion that allows the operator to enter a rating for the participant. A rating input box 840 allows a rating to be entered. In various examples, the participant's rating reflects a quality evaluation by the operator, other personnel, automated techniques, other techniques, or combinations of these, of observation data such as photographs captured by the participant and that are sent back to the central computer, the efficiency with which the participant performed tasks instructed by the operator, other evaluations of the participant, or combinations of these. In an example, the rating input box 840 may allow entry of a number, such as between zero (0) and ten (10), words such as "good" or "bad," any other evaluation, or combinations of these. In an example, a participant who receives a low rating or a number of low ratings may not be sent offers to perform observations in the future.

The illustrated operator's observation view 800 includes a text to participant section 830. The text to participant section 830 allows text messages to be exchanged with the participant who is observing the selected object and sending images back to the computer server. The text to participant section 830 includes a text entry box 832 that allows the operator to enter text to send to the participant. A send button 834 is able to be selected to cause the text in the text entry box 832 to be sent to the participant. A text history box 836 displays a history of text messages exchanged between the operator and the participant. The text history box 836 is able to store and display any number of previously exchanged text messages. A scroll bar 838 allows the operator to scroll through text messages in the text history box 836.

In addition to exchanging text messages, in some examples an operator is able to exchange live audio with the participant. For example, the operator is able to wear a headset with a microphone to use a one way or bi-directional audio link between the operator and the communications device used by the participant. Such an audio link allows the operator to provide spoken instructions to the participant, and hear questions asked by the participant. In an example, an audio link is also able to allow the operator to hear sounds in the vicinity of the selected object, such as sounds emitted by the selected object or objects in its vicinity.

Figure 9:
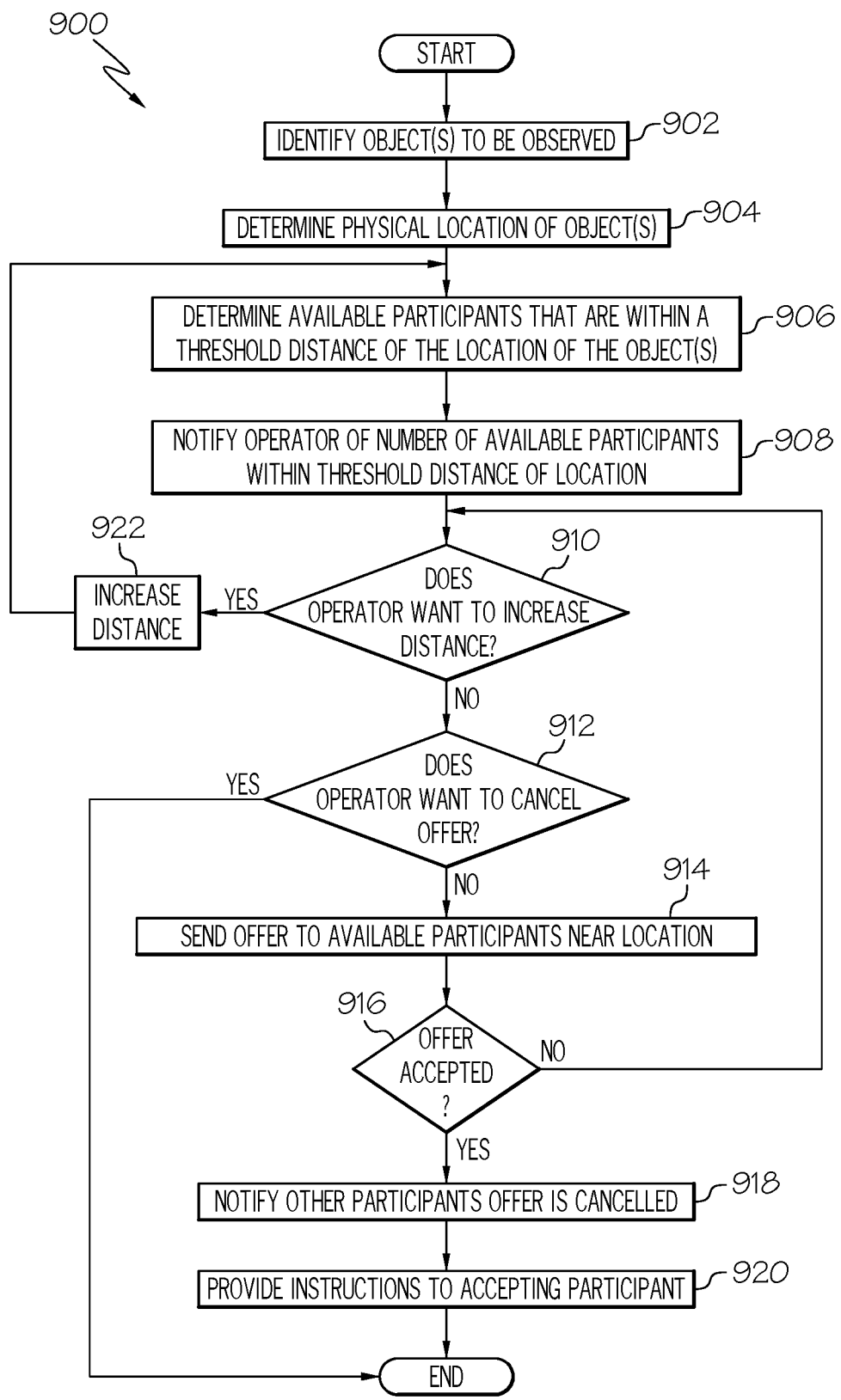
FIG. 9 illustrates a crowd sourced observation offer process, according to an example.

FIG. 9 illustrates a crowd sourced observation offer process 900, according to an example. The crowd sourced observation offer process 900 is an example of a process by which an operator at workstation 802 is able to initiate an offer, as described above with regards to the central operator's user interface 700, that is sent to participants that are near a selected object to be observed. In an example, the offer that is sent to each participant that is near the selected object is described above with regards to the first participant's offer notification display 200 and the second participant's offer notification display 300. As is further discussed above, the first participant to accept the offer causes an offer cancellation to be sent to the other participants who received the offer. The participant who accepted the offer is able to perform the observation.

The crowd sourced observation offer process 900 begins by identifying, at 902, the object(s) to be observed. Any suitable technique is able to be used to determine one or more objects at a particularly location that are to be observed by participants in the crowd sourced observation program. In some examples, objects to be observed are able to be identified via partially automated means, fully automated means, manual means, any suitable means, or combinations of these. For example, SCADA systems or other monitoring systems may indicate that a particular object in an electrical distribution system may be malfunctioning and that a visual observation would assist in determining whether to send maintenance personnel to the object(s). The object(s) to be observed are able to be identified by any suitable technique, such as is described above with regards to the central operator's user interface 700.

The crowd sourced observation offer process 900 includes determining, at 904, the physical location of the object(s) to be observed. The physical location of the objects to be observed is referred to herein as the geographic location for observation. In an example, the location of an identified object, such as an object specified by any means, is able to be determined based on geographical location data that is maintained for installed equipment. In some examples, the geographic location for observation is able to be entered directly by an operator at workstation(s) 102, such as by indicating a location on a map display.

The crowd sourced observation offer process 900 determines, at 906, available participants that are within a threshold distance of the location of the object(s). In various examples, any suitable technique is able to be used to indicate whether a participant is available. In some examples, a participant is able provide an indication via his or her communications device whether he or she is available and interested in accepting offers to observe objects. In some example, all participants within the threshold distance of the object and who have operating communications devices able to receive offers are determined to be available.

The distance between the object(s) to be observed and each participant is also able to be determined by any suitable technique. In an example, the communications device used by each participant is able to determine the present geographic location of that device's location and report that present geographic position back to the computer server 104 described above. The computer server 104 receives respective present geographic locations from each participant camera within a group of available participant cameras. The computer server is then able to determine the distance between each of those participants and the object(s) to be observed, determine whether that respective distance is below a threshold, and thus determine which participants are to receive offers based on their being sufficiently close to the object(s) to be observed. In various examples, the distance between a particular participant and the object to be observed is determined based on a straight line distance, a distance along roadways or other paths that the participant would take to reach the object(s) to be observed, any other suitable measure of distance, or combinations of these. In general, determining participants to which to send offers includes identifying participants within the threshold distance of the geographic location based on a comparison of the geographic location for observation to the respective present geographic location received from the each participant in the group of available participants.

The operator is notified, at 908, of the number of available participants within the threshold distance of the location. The operator may base a decision to send an offer to the available nearby participants based on the value of this number. For example, if too few participants are nearby the object, the operator may decide to not send offers to those participants.

A determination is made, at 910, as to whether the operator wants to increase the threshold distance for participants to which the offer is to be extended. In an example, this determination is based on inputs provided by the operator using the workstation 102 discussed above. The operator may want to increase the threshold distance if the number of participants within the current threshold distance, as was indicated above, is too low. If the operator wants to increase the threshold distance, the threshold distance is increased, at 922

In the event the operator does not want to increase the threshold distance, a determination is made, at 912, as to whether the operator wishes to cancel the offer. This determination is able to be based on inputs provided by the operator via workstation 102. The operator may decide to cancel the offer based on any factor, such as the number of available participants being too low. If the offer is to be cancelled, the crowd sourced observation offer process 900 ends.

If the offer is not to be cancelled, the offer is sent, at 914, to available participants near the location. A determination is them made, at 916, as to whether the offer was accepted. In an example, an offer is able to be accepted by receiving a first response from an accepting participant. The accepting participant in this example is the first participant to sends a response, i.e., the first response, to the offer. In an example, the first response is a response that is received prior to any response from another participant, other than the accepting participant, accepting the offer.

In an example, this determination is able to be made after a determined amount of time passes after the offer is sent to the participants. If the offer is not accepted, the crowd sourced observation offer process 900 returns to determining whether the operator wants to increase the threshold distance from the object to be observed that is used to determine participants who are to be sent an offer to perform the observation.

If the offer is accepted, other participants are notified, at 918, that the offer is cancelled. Such notifications are an example of sending, based on receiving the first response from the accepting participant, a cancellation of the offer to each participant in a plurality of participants other than the accepting participant. The operator, such as an operator at workstation 102 described above, then provides instructions to the accepting participant, at 920. In an example, the instructing the participant includes instructing the participant to go to the geographic location for observation and provide observation of the selected object. In some examples, instructing the participant includes sending an example depiction, such as a stock image, drawings, other visual depiction, or combinations of these, of the selected object. The crowd sourced observation offer process 900 then ends.

Figure 10:
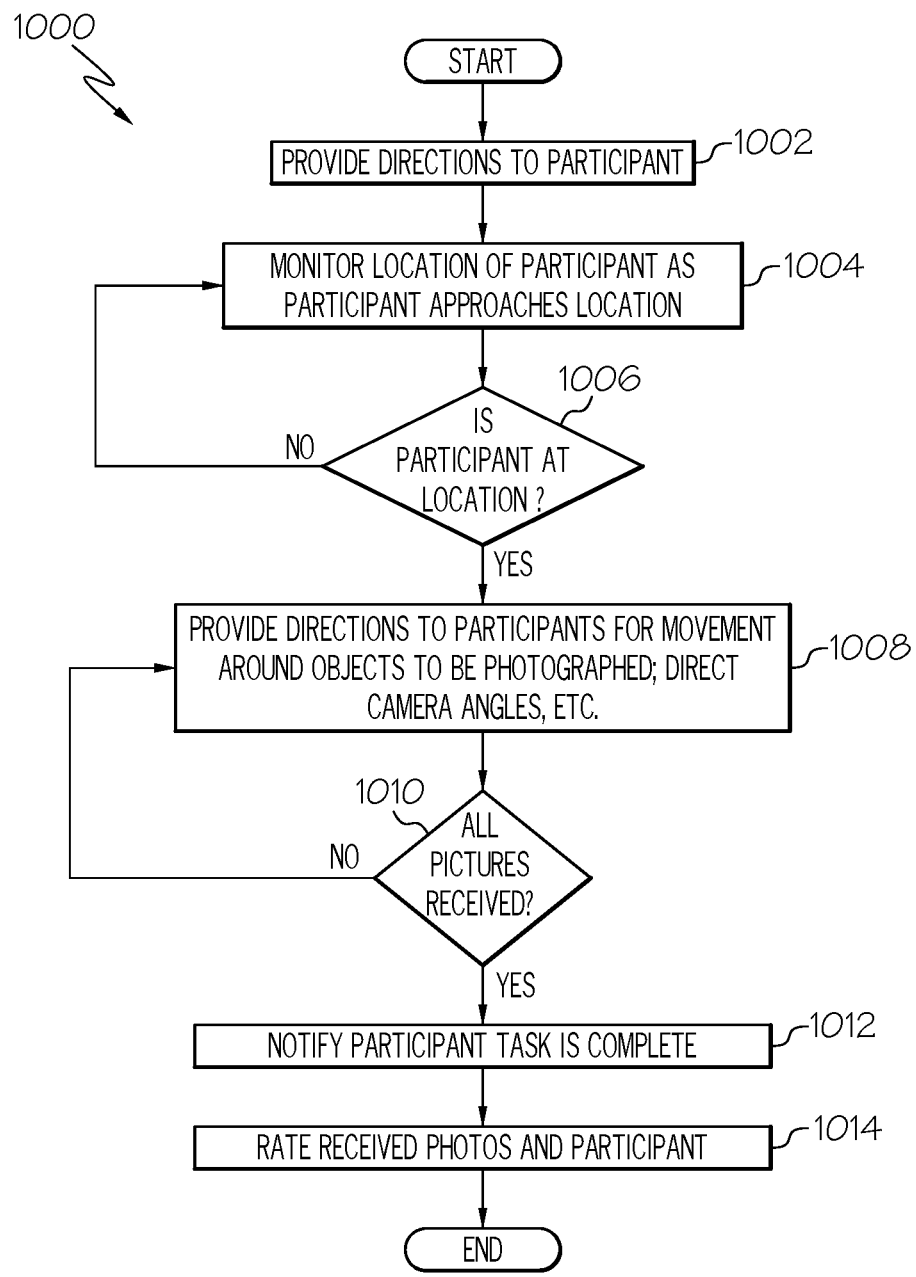
FIG. 10 illustrates a crowd source participant interaction process, according to an example.

FIG. 10 illustrates a crowd source participant interaction process 1000, according to an example. The crowd source participant interaction process 1000 is an example of a process that facilitates the interaction between a participant who has accepted the offer to perform an observation of a selected object 210 and an operator at a workstation 102. In an example, the operator is able to oversee directing the participant to the location of the selected object 210. Once the participant reaches that location, the operator is able to direct the observation tasks performed by that participant.

The crowd source participant interaction process 1000 in an example provides directions to the participant, at 1002. These directions are able to be given in any suitable form, such as a complete set of directions delivered initially, an updated, so called "turn-by-turn" set of directions as the participant moves to the location of the selected objects 210, any other form, or combinations of these.

The location of the participant is monitored, at 1004, as the participant approaches the location of the selected object. In an example, the location of the participant who accepted the offer is determined by location equipment within the participant's communications device. In such an example, the communications device sends the determined location to the computer server 104. In some examples, updated directions are able to be provided to the participant as he or she approaches the location of the selected object 210. If the participant is not at the location, the crowd source participant interaction process 1000 returns to monitoring, at 1004, the location of the participant as is discussed above.

A determination, at 1006, is made as to whether the participant is at the location. In an example, this determination is based on determining that the participant is sufficiently close to the selected object 210 to be observed that the participant can begin to perform observations. In general, this determination is based on determining that the participant is close enough to see or otherwise observe the object. This determination is not limited to determining that the participant is immediately next to the selected object. In some examples, access to the selected object 210 is restricted, such as by a fence, and the participant is not able to be immediately adjacent to the selected object. This determination in an example accounts for such access limitations, such as fences around the selected object 210, but determining that the participant is at the selected object 210 when the participant is reasonably near a fence or other barrier around the selected object 210.

If it is determined that the participant is at the selected object 210, the crowd source participant interaction process 1000 provides, at 1008, directions to the participant for movement around objects to be photographed, provides the participant with directions regarding camera angles, and the like. In general, these directions are able to be provided by any suitable technique, such as by textual messages sent to a communications device used by the participant, by audio messages spoken by the operator at the workstation 102, by any suitable technique, or combinations of these.

In an example, such directions are able to be provided by augmented reality display elements. Examples of such augmented reality display elements are described above with regards to the image camera display 160 in the crowd sourced observation program apparatus configuration 100. Displaying one or more direction arrows on the image camera display 160 is an example of providing instructions via augmented reality instructions on the display of the accepting participant camera for capturing additional images of the object. In a further example, directions provided to the participant for movement includes determining a geographic location of the object to be observe, receiving, while providing instruction to the accepting participant camera for capturing additional images, a present geographic location and a present pose angle of the accepting participant camera, and determining, based on the geographic location of the object and the present geographic location of the accepting participant camera, a directional vector from the present geographic location of the accepting participant camera to the object. Additional directions to the participant are then given, such as via augmented reality instructions depicted on the image capture display 160, based on the difference between the present pose angle of the accepting participant camera and the directional vector.

A determination is made, at 1010, as to whether all pictures have been received. In general, this determination considers and is based on evaluating whether all of the desired observations that the participant can make of the selected object 210 have been made. If this determination is false, the crowd source participant interaction process 1000 returns to providing directions to the participant, at 1008, as is described above.

If it is determined that all photographs have been received, the participant is notified, at 1012, that the task is complete. The operator is then able to rate the received photos and the participant, at 1014. In an example, the operator is able to provide an input to indicate his or her present rating data to indicate his or her quality evaluation of any observation data. In various examples, the present ratings data is able to reflect a quality evaluation of observation data, such as image data or video data of the selected object 210, that is provided by the participant, a quality evaluation of the performance of the participant, any other quality evaluation, or combinations of these. This data in an example is based on the quality of the observation data, such as image data, and the abilities of the participant to follow provided directions and capture images or other data as directed by the operator. Ratings data maintained in the computer server 104 in an example are updated with this operator's ratings for this observation. In some examples, one or more low ratings may result in excluding that participant from receiving future offers. The crowd source participant interaction process 1000 then ends.

Figure 11:
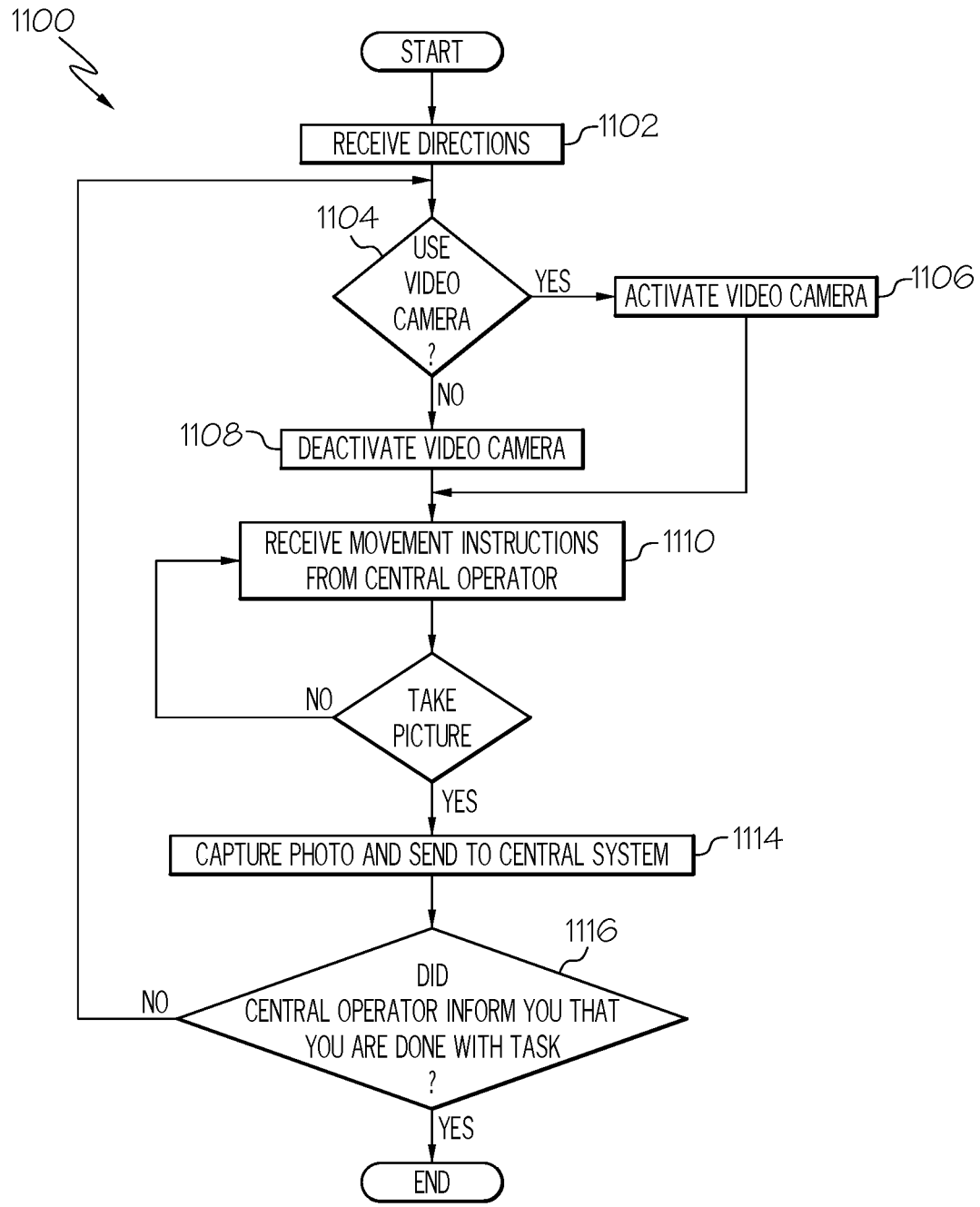
FIG. 11 illustrates an observation process, according to an example.

FIG. 11 illustrates an observation process 1100, according to an example. The participant observation process 1100 is an example of a process performed by a processor within a communications device of a participant in the crowd sourced observation program once that participant is at the location of the selected object 210 to be observed. In an example, the observation process 1100 starts after the participant has successfully accepted the offer to perform an observation and traveled to the location of the selected object 210. In an example, the communications device includes software, such as a smartphone "app," to assist the participant in performing the observation task. In an example, the observation process 1100 is performed as the observation instruction display 600 is presented to the participant on his or her communications device.

The observation process 1100 receives directions, at 1102. In an example, these are directions sent by the operator as described above, at 1008, with regards to the crowd source participant interaction process 1000. In general, these directions direct the participant in his or her performing the observation tasks as instructed by the operator at workstation 102.

A determination is made, at 1104, as to whether it is desired to have the communications device operated by the participant capture video and send that video back to the computer server 104. In an example, the communications device is able to stream video that is captured by the communications device in order to assist the operator at the workstation 102 in directing the participant in capturing images of the selected object 210. If it is determined that the video camera is to be used, the video camera is activated, at 1106. Otherwise, the video camera is deactivated, at 1108. Although this portion of the observation process 1100 describes activating and deactivating the video camera, in situations where the camera is already activated, or deactivated, its activation state is merely unchanged.

After the video camera is activated or deactivated, movement instructions are received, at 1110, from the central operator at the workstation 102. Such movement instructions are able to include, for example, instructions for the participant to physically move to another location around the selected object 210, instructions to move the pointing angle of his or her camera, other instructions, or combinations of these. In an example, while the participant is receiving instructions to physically move, the operator is able to track the location of the participant, such as via locations reported by the participant's communications device, to insure the participant does not move to an unsafe area. For example, if the operator determines the participant is moving towards a street, these instructions are able to instruct the participant to move in another direction to avoid the street.

A determination is made as to whether a picture is to be taken, at 1112. The decision to take a picture is able to be based on the participant's judgement, based on an instruction from the operator at the workstation 102, or both. In some examples, the operator is able to instruct the participant to take a picture, and the participant operates his or her device to capture an image. In some examples, the operator at the workstation 102 is able to remotely control the camera associated with the participant's communication's device and remotely cause an image to be captured. If it is determined that a picture is not to be taken, the observation process 1100 returns to receiving movement instructions from the operator at workstation 102, at 1110, as is described above.

If it is determined a picture is to be take, a photo is captured and sent to the central system, at 1114. A determination is made, at 1116, as to whether the operator instructs the participant that the observation task is complete. If the operator has not so instructed the participant, the observation process 1100 returns to determining, at 1104, whether the video camera is to be used as is described above. If the operator instructs the participant that the observation task is done, the observation process 1100 ends.

FIG. 12 illustrates a block diagram illustrating a processor 1200 according to an example. The processor 1200 is an example of a processing subsystem that is able to perform any of the above described processing operations, control operations, other operations, or combinations of these.

The processor 1200 in this example includes a CPU 1204 that is communicatively connected to a main memory 1206 (e.g., volatile memory), a non-volatile memory 1212 to support processing operations. The CPU is further communicatively coupled to a network adapter hardware 1216 to support input and output communications with external computing systems such as through the illustrated network 1230.

The processor 1200 further includes a data input/output (I/O) processor 1214 that is able to be adapted to communicate with any type of equipment, such as the illustrated system components 1228. The data input/output (I/O) processor in various examples is able to be configured to support any type of data communications connections including present day analog and/or digital techniques or via a future communications mechanism. A system bus 1218 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for managing a crowd sourced observation program by an electric power utility, the method comprising:
   determining a plurality of participant cameras where each participant camera in the plurality of participant cameras is within a threshold distance of a geographic location for observation;
   sending, to each participant camera in the plurality of participant cameras, an offer to perform an observation of an object at the geographic location to capture at least one of an image or a video of the object, wherein the object comprises installed electric power equipment;
   receiving a respective acceptance of the offer from at least one participating camera in the plurality of participant cameras;
   selecting, based on receiving the respective acceptance of the offer from at least one participating camera, an accepting participant camera of the plurality of participant cameras to perform the observation to capture at least one of an image or a video of an object;
   sending, prior to receiving the at least one of the image or the video and based on receiving the respective acceptance of the offer from at least one participating camera, and based on selecting the accepting participant camera, a cancellation of an offer to each participant camera in the plurality of participant cameras other than the selected accepting participant camera;
   instructing, based on the selecting, the accepting participant camera to go to the geographic location to capture the at least one of the image or the video of the object at the geographic location;
   displaying, on a workstation remote from the accepting participant camera, a depiction of the accepting participant camera's location relative to the object;
   receiving, via a user interface based on displaying the depiction of the accepting participant camera's location relative to the object, movement directions for the accepting participant camera;
   sending the movement directions to the accepting participant camera;
   receiving the at least one of the image or the video of the object based on sending the movement directions to the accepting participant camera;
   sending a command from the workstation to the accepting participating camera to activate a video camera on the accepting participating camera;
   activating, based on sending the command, the video camera on the accepting participating camera;
   receiving, at the workstation, video captured by the video camera; and
   sending additional movement instructions based on displaying, on the workstation, the video captured by the video camera and based on the depiction of the accepting participant camera's location on the workstation.

2. The method of claim 1, where:
   receiving the respective acceptance of the offer comprises receiving a first response accepting the offer from a first participant camera within the plurality of participant cameras, the first response being received prior to any response from another participant camera accepting the offer,
   where selecting the accepting participant camera selects the first participant camera as the accepting participant camera based on receiving the first response.

3. The method of claim 1, further comprising maintaining a list of participants of a crowd sourced observation program, where the participants are each associated with a respective participant camera, are able to choose to voluntarily participate in the crowd sourced observation program, and are not employed by a sponsor of the crowd sourced observation program.

4. The method of claim 1, further comprising:
   receiving, from each participant camera within a group of available participant cameras prior to determining the plurality of participant cameras, a respective present geographic location, and
   where the determining the plurality of participant cameras comprises identifying participant cameras within the threshold distance of the geographic location based on a comparison of the geographic location for observation to the respective present geographic location received from the each participant camera in the group of available participant cameras.

5. The method of claim 1, where instructing the accepting participant camera comprises sending, to the accepting participant camera, an image depicting an example of the object whose image is to be captured.

6. The method of claim 1, further comprising receiving an indication of the geographic location for observation from an operator.

7. The method of claim 1, further comprising:
   receiving, prior to determining the plurality of participant cameras, an indication of the object;
   determining a geographic location of the object; and
   wherein the geographic location for observation is determined based on the geographic location of the object.

8. The method of claim 1, further comprising:
   storing rating data for each participant camera;
   receiving, after instructing the accepting participant camera to go to the geographic location to capture the at least one of the image or the video of the object, observation data from the accepting participant camera; and receiving, from an operator based on receiving the observation data, present rating data reflecting a quality evaluation of the observation data, wherein updating rating data for the accepting participant camera based on the present rating data, and wherein determining the plurality of participant cameras is further based on ratings data for the participant cameras.

9. The method of claim 1, the method further comprising providing, based on receiving the image capture, instructions to the accepting participant camera for capturing additional images of the object.

10. The method of claim 9, wherein the accepting participant camera has an image capture display for displaying the image capture, and wherein providing instructions to the accepting participant camera comprises instructing the accepting participant camera to display augmented reality instructions on the image capture display for locating the object in the additional images of the object.

11. The method of claim 9, further comprising:
determining a geographic location of the object;
receiving, while providing instruction to the accepting participant camera for capturing additional images, a present geographic location and a present pose angle of the accepting participant camera;
determining, based on the geographic location of the object and the present geographic location of the accepting participant camera, a directional vector from the present geographic location of the accepting participant camera to the object;
determining an additional instruction for capturing additional images based on a difference between the present pose angle of the accepting participant camera and the directional vector; and
providing the additional instructions to the accepting participant camera.

12. A system for managing a crowd sourced observation program by an electric power utility, the system comprising:
a processor;
a memory communicatively coupled to the processor;
the processor, when operating, being configured to:
determine a plurality of participant cameras where each participant camera in the plurality of participant cameras is within a threshold distance of a geographic location for observation;
send, to each participant camera in the plurality of participant cameras, an offer to perform an observation of an object at the geographic location to capture at least one of an image or a video of the object, wherein the object comprises installed electric power equipment;
receive a respective acceptance of the offer from at least one participating camera in the plurality of participant cameras;
select, based on receipt of the respective acceptance of the offer from at least one participating camera, an accepting participant camera of the plurality of participant cameras to perform the observation to capture at least one of an image or a video of an object;
send, prior to receiving the at least one of the image or the video and based on receiving the respective acceptance of the offer from at least one participating camera, and based on a selection of the accepting participant camera, a cancellation of an offer to each participant camera in the plurality of participant cameras other than the selected accepting participant camera; and instruct, based on the selection of the accepting participant camera, the accepting participant camera to go to the geographic location to capture the at least one of the image or the video of the object at the geographic location;

display, on a workstation remote from the accepting participant camera, a depiction of the accepting participant camera's location relative to the object;

receive, via a user interface based on a display of the depiction of the accepting participant camera's location relative to the object, movement directions for the accepting participant camera;

send the movement directions to the accepting participant camera;

receive the at least one of the image or the video of the object based on sending the movement directions to the accepting participant camera;

send a command from the workstation to the accepting participating camera to activate a video camera on the accepting participating camera;

activate, based on sending the command, the video camera on the accepting participating camera;

receive, at the workstation, video captured by the video camera; and send additional movement instructions based on displaying, on the workstation, the video captured by the video camera and based on the depiction of the accepting participant camera's location on the workstation.

13. The system of claim 12, wherein the processor is further configured to maintain a list of participants of a crowd sourced observation program, where the participants are each associated with a respective participant camera, are able to choose to voluntarily participate in the crowd sourced observation program, and are not employed by a sponsor of the crowd sourced observation program.

14. The system of claim 12, wherein the processor is further configured to:
receive, from each participant camera within a group of available participant cameras prior to determining the plurality of participant cameras, a respective present geographic location, and
determine the plurality of participant cameras by at least identifying participant cameras within the threshold distance of the geographic location based on a comparison of the geographic location for observation to the respective present geographic location received from the each participant camera in the group of available participant cameras.

15. The system of claim 12, wherein the processor is further configured to instruct the accepting participant camera by at least sending, to the accepting participant camera, an image depicting an example of the object whose image is to be captured.

16. The system of claim 12, wherein the processor is further configured to:
receive, prior to determining the plurality of participant cameras, an indication of the object;
determine a geographic location of the object; and
wherein the geographic location for observation is determined based on the geographic location of the object.

17. The system of claim 12, wherein the processor is further configured to:
store rating data for each participant camera;
receive, after instructing the accepting participant camera to go to the geographic location to capture the at least one of the image or the video of the object, observation data from the accepting participant camera; and receive, from an operator based on receiving the observation data, present rating data reflecting a quality evaluation of the observation data, wherein update rating data for the accepting participant camera based on the present rating data, wherein the plurality of participant cameras is determined further based on ratings data for the participant cameras.

18. The system of claim 12, wherein the processor is further configured to provide, based on receipt of the image capture, instructions to the accepting participant camera for capturing additional images of the object.

19. A non-transitory computer program product for managing a crowd sourced observation program by an electric power utility, the computer program product comprising:

determining a plurality of participant cameras where each participant camera in the plurality of participant cameras is within a threshold distance of a geographic location for observation;

sending, to each participant camera in the plurality of participant cameras, an offer to perform an observation of an object at the geographic location to capture at least one of an image or a video of the object, wherein the object comprises installed electric power equipment;

receiving a respective acceptance of the offer from at least one participating camera in the plurality of participant cameras;

selecting, based on receiving the respective acceptance of the offer from at least one participating camera, an accepting participant camera of the plurality of participant cameras to perform the observation to capture at least one of an image or a video of an object;

sending, prior to receiving the at least one of the image or the video and based on receiving the respective acceptance of the offer from at least one participating camera, and based on selecting the accepting participant camera, a cancellation of an offer to each participant camera in the plurality of participant cameras other than the selected accepting participant camera;

instructing, based on the selecting, the accepting participant camera to go to the geographic location to capture the at least one of the image or the video of the object at the geographic location;

displaying, on a workstation remote from the accepting participant camera, a depiction of the accepting participant camera's location relative to the object;

receiving, via a user interface based on displaying the depiction of the accepting participant camera's location relative to the object, movement directions for the accepting participant camera;

sending the movement directions to the accepting participant camera;

receiving the at least one of the image or the video of the object based on sending the movement directions to the accepting participant camera;

sending a command from the workstation to the accepting participating camera to activate a video camera on the accepting participating camera;

activating, based on sending the command, the video camera on the accepting participating camera;

receiving, at the workstation, video captured by the video camera; and sending additional movement instructions based on displaying, on the workstation, the video captured by the video camera and based on the depiction of the accepting participant camera's location on the workstation.

* * * * *